US012381856B2

(12) United States Patent
Kussmaul et al.

(10) Patent No.: US 12,381,856 B2
(45) Date of Patent: Aug. 5, 2025

(54) BUILDING AND USING ATTESTATION MODEL IN CONFIDENTIAL COMPUTING

(71) Applicant: International Business Machines Corporation, Armonk, NY (US)

(72) Inventors: Timo Kussmaul, Boeblingen (DE); Peng Hui Jiang, Beijing (CN); Stefan Schmitt, Holzgerlingen (DE); Xiang Dong Hu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 18/093,757

(22) Filed: Jan. 5, 2023

(65) Prior Publication Data

US 2024/0236050 A1 Jul. 11, 2024

(51) Int. Cl.
*H04L 9/40* (2022.01)

(52) U.S. Cl.
CPC ................. *H04L 63/0428* (2013.01)

(58) Field of Classification Search
CPC .................................................. H04L 63/0428
USPC .......................................................... 726/4
See application file for complete search history.

(56) References Cited

U.S. PATENT DOCUMENTS

| 7,770,000 | B2 | 8/2010 | Schunter et al. |
| 2019/0095498 | A1* | 3/2019 | Srinivasan ............ H04L 63/102 |
| 2021/0232933 | A1* | 7/2021 | Gu ............................ G06N 3/08 |
| 2021/0336994 | A1 | 10/2021 | Scarlata et al. |
| 2022/0019667 | A1 | 1/2022 | Sood et al. |
| 2022/0114251 | A1* | 4/2022 | Guim Bernat ........ G06F 21/577 |
| 2022/0121455 | A1* | 4/2022 | Hoban ................ H04L 41/5054 |
| 2024/0160717 | A1* | 5/2024 | Raghuram .............. G06F 21/64 |

FOREIGN PATENT DOCUMENTS

WO 2012145347 A1 10/2012

OTHER PUBLICATIONS

Liu et al., "Confidential Attestation: Efficient in-Enclave Verification of Privacy Policy Compliance," arXiv preprint, 2020, pp. 1-16, retrieved from https://arxiv.org/abs/2007.10513.

(Continued)

*Primary Examiner* — Dant B Shaifer Harriman
(74) *Attorney, Agent, or Firm* — Zilka-Kotab, P.C.

(57) ABSTRACT

A computer-implemented method for building and using a multi-party Attestation Model for controlling operation of a multi-tenant cloud infrastructure which includes providing a trusted execution environment (TEE) within the multi-tenant cloud infrastructure, receiving a set of requirements from each of a plurality of tenants of the multi-tenant cloud infrastructure, building an Attestation Model according to the sets of requirements, and deploying the Attestation Model within the TEE. In response to a determination that a change does not satisfy the Attestation Model for each of the plurality of tenants, a function is performed to separate components shared between tenants for which the change satisfies the Attestation Model from components shared between tenants for which the change does not satisfy the Attestation Model, and the change is deployed on the multi-tenant cloud infrastructure for the tenants for which the change satisfies the Attestation Model.

20 Claims, 7 Drawing Sheets

(56) References Cited

OTHER PUBLICATIONS

Shanmugam et al., "Trusted Computing Model with Attestation to Assure Security for Software Services in a Cloud Environment," International Journal of Intelligent Engineering and Systems, vol. 10, No. 1, 2017, pp. 144-153.
Microsoft, "Confidential Computing on Azure," Microsoft, Nov. 17, 2021, 5 pages, retrieved on Jul. 20, 2022 from https://learn.microsoft.com/en-us/azure/confidential-computing/overview-azure-products.
Gu et al., "Model-Driven Remote Attestation: Attesting Remote System from Behavioral Aspect," ICYCS 9th International Conference for Young Computer Scientists, Nov. 2008, pp. 2347-2353.
Hardjono et al., "Towards an attestation architecture for blockchain networks," World Wide Web, 2021, pp. 1587-1615.
Keystone, "What is Keystone Enclave?" Keystone, 2021, 4 pages, retrieved from https://keystone-enclave.org/.

* cited by examiner

```
Contract AssertDBClient appliesTo DBaaS :
Context @inject context : [ "serviced" ]
Property @inject client :[ "name", "tenantid", "userid", "device", "location-country", "device-isattested" ]

On Event("DBaaSClientEvent")
On Timeout(scope: "/service/" + context.serviceid + "/client/" + client.userid)

Function check {
  if client.location-country is not in country-allowedlist:
    throw(non-repairable, msg: non-allowed-country)

if !device-isattested:
    throw(non-repairable, msg: non-attested-device)

if !checkPermissions(serviceid, tenanted, userid):
    throw(non-repairable, msg: no-permissions)

updateAttestationModel(scope: "/service/" + id + "/client/" + client.userid, timeout: 30)
}
```

FIG. 7A

```
Contract AssertDBNodes appliesTo DBaaS :
Context @inject context : [ "serviced", nodes : [ "id" ] [ ] ]

On Event("DBaaSNodeEvent")
On Timeout(scope: "/service/" + context.serviceid + "/nodes")

Function check {
  for all context.nodes:
    if !AttestationModel.check(context.nodes.id):
      throw(repairable, action: reject)

updateAttestationModel(scope: "/service/" + id + "/nodes", timeout: 30)
}
```

FIG. 7B

BUILDING AND USING ATTESTATION MODEL IN CONFIDENTIAL COMPUTING

BACKGROUND

The present invention relates to confidential computing, and more specifically, this invention relates to a method of building and using an Attestation Model in confidential computing.

Confidential computing is a cloud computing technology that protects data in use. For instance, confidential computing isolates sensitive data in a protected CPU enclave or a Trusted Execution Environment during processing; and this data and the techniques used to process the data, may be accessible only to an authorized programming code and are invisible and unknowable to anything or anyone else, including the cloud provider.

The primary goal of confidential computing is to provide greater assurance to customers that their data in the cloud is protected and confidential, and to encourage them to move more of their sensitive data and computing workloads to cloud services.

Different cloud customers have different requirements on the cloud stack running on cloud services. One key problem is how to build a trusted environment including trusted infrastructure, trusted runtime environment, trusted code stack, and trusted vendors selection. It is hard, however, to build automated and configured trusted environments to provide tailored build and deploy policy between cloud Service Providers and customers.

In particular, the client does not have a means for verifying the integrity of the cloud environment against non-trivial requirements. Moreover, it would be desirable to build an automated environment that allows operation of non-trivial requirements for each party of a multi-party environment.

SUMMARY

In one embodiment, a computer-implemented method for building and using a multi-party Attestation Model for controlling operation of a multi-tenant cloud infrastructure includes providing a trusted execution environment (TEE) within the multi-tenant cloud infrastructure, receiving a set of requirements from each of a plurality of tenants of the multi-tenant cloud infrastructure, building an Attestation Model according to the sets of requirements, and deploying the Attestation Model within the TEE. In response to a determination that a change does not satisfy the Attestation Model for each of the plurality of tenants, a function is performed to separate components shared between tenants for which the change satisfies the Attestation Model from components shared between tenants for which the change does not satisfy the Attestation Model, and the change is deployed on the multi-tenant cloud infrastructure for the tenants for which the change satisfies the Attestation Model.

In another embodiment, a computer-implemented method for controlling operation of a multi-tenant cloud infrastructure in a computing environment includes providing an execution environment including a set of components, where the set of components is operated in the execution environment. The execution environment is configured to provide an attestation of a set of properties related to the components. The computer-implemented method includes creating an Attestation Model and facilitating creation of a smart contract. The smart contract includes instructions for modeling conditions on a state and/or context of the computing environment, evaluating attestation records according to the conditions of the computing environment, and updating the Attestation Model according to the evaluation of the attestation records. In response to a determination of the state and/or context of the computing environment and the conditions of a plurality of smart contracts, a smart contract is selected for execution, and the smart contract is executed in at least one execution environment.

According to yet another embodiment, a system in a computing environment includes a module comprising a client attestation service operating in an execution environment where the client attestation service comprises a set of services, each service comprising a plurality of components, and an Attestation Model based on a cryptographically assured attestation of a set of properties related to the components operating in the execution environment. The system includes a processor and logic integrated with the processor, executable by the processor, or integrated with and executable by the processor, the logic being configured to facilitate creation of at least one smart contract comprising instructions for updating the Attestation Model according to a state and/or context of the computing environment. Moreover, in response to a determination of the state and/or context of the computing environment, the logic is configured to select a smart contract and execute the smart contract in the execution environment.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 7A is an example smart contract provided by a service provider, in accordance with one embodiment of the present invention.

FIG. 7B is an example smart contract provided by a client, in accordance with one embodiment of the present invention.

DETAILED DESCRIPTION

Figure 1:
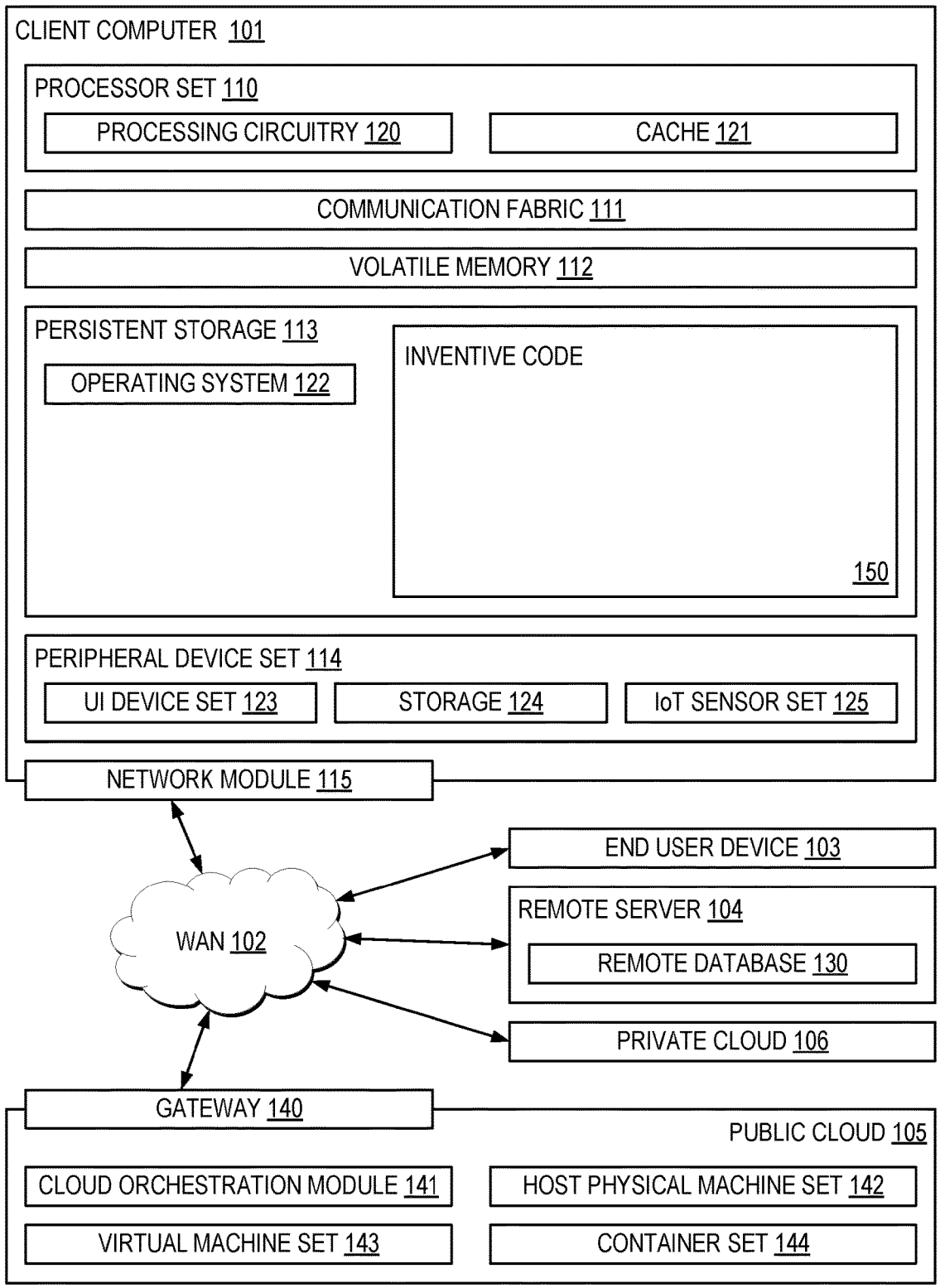
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for building and using an Attestation Model in confidential computing.

In one general embodiment, a computer-implemented method for building and using a multi-party Attestation Model for controlling operation of a multi-tenant cloud infrastructure includes providing a trusted execution environment (TEE) within the multi-tenant cloud infrastructure, receiving a set of requirements from each of a plurality of tenants of the multi-tenant cloud infrastructure, building an Attestation Model according to the sets of requirements, and deploying the Attestation Model within the TEE. In response to a determination that a change does not satisfy the Attestation Model for each of the plurality of tenants, a function is performed to separate components shared between tenants for which the change satisfies the Attestation Model from components shared between tenants for which the change does not satisfy the Attestation Model, and the change is deployed on the multi-tenant cloud infrastructure for the tenants for which the change satisfies the Attestation Model.

In another general embodiment, a computer-implemented method for controlling operation of a multi-tenant cloud infrastructure in a computing environment includes providing an execution environment including a set of components, where the set of components is operated in the execution environment. The execution environment is configured to provide an attestation of a set of properties related to the components. The computer-implemented method includes creating an Attestation Model and facilitating creation of a smart contract. The smart contract includes instructions for modeling conditions on a state and/or context of the computing environment, evaluating attestation records according to the conditions of the computing environment, and updating the Attestation Model according to the evaluation of the attestation records. In response to a determination of the state and/or context of the computing environment and the conditions of a plurality of smart contracts, a smart contract is selected for execution, and the smart contract is executed in at least one execution environment.

According to yet another general embodiment, a system in a computing environment includes a module comprising a client attestation service operating in an execution environment where the client attestation service comprises a set of services, each service comprising a plurality of components, and an Attestation Model based on a cryptographically assured attestation of a set of properties related to the components operating in the execution environment. The system includes a processor and logic integrated with the processor, executable by the processor, or integrated with and executable by the processor, the logic being configured to facilitate creation of at least one smart contract comprising instructions for updating the Attestation Model according to a state and/or context of the computing environment. Moreover, in response to a determination of the state and/or context of the computing environment, the logic is configured to select a smart contract and execute the smart contract in the execution environment.

A list of acronyms used in the description is provided below.

| | |
|---|---|
| API | application programming interface |
| ASIC | application specific integrated circuit |
| CAS | client attestation service |
| CD-ROM | compact disc read-only memory |
| CPP | computer program product |
| CPU | central processing unit |
| DB | database |
| DBaaS | database as a service |
| DVD | digital versatile disk |
| EPROM | erasable programmable read-only memory |
| EUD | end user device |
| FPGA | field programmable gate array |
| GPU | graphics processing unit |
| HDD | hard disk drives |
| IC | integrated circuit |
| ID | identification |
| I/O | input/output |
| IoT | Internet of Things |
| LAN | local area network |
| NFC | Near-Field Communication |
| NVM | nonvolatile memory |
| RAM | random access memory |
| ROM | read-only memory |
| SAN | storage area network |
| SC | smart contract |
| SD | secure digital |
| SDN | software-defined networking |
| SRAM | static random access memory |
| SRE | site reliability engineer |
| SSD | solid state drive |
| TEE | trusted execution environment |
| UI | user interface |
| USB | universal serial bus |
| VCE | virtual computing environment |
| WAN | wide area network |

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as the system and method of building, updating, and maintaining an Attestation Model of block 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 2:
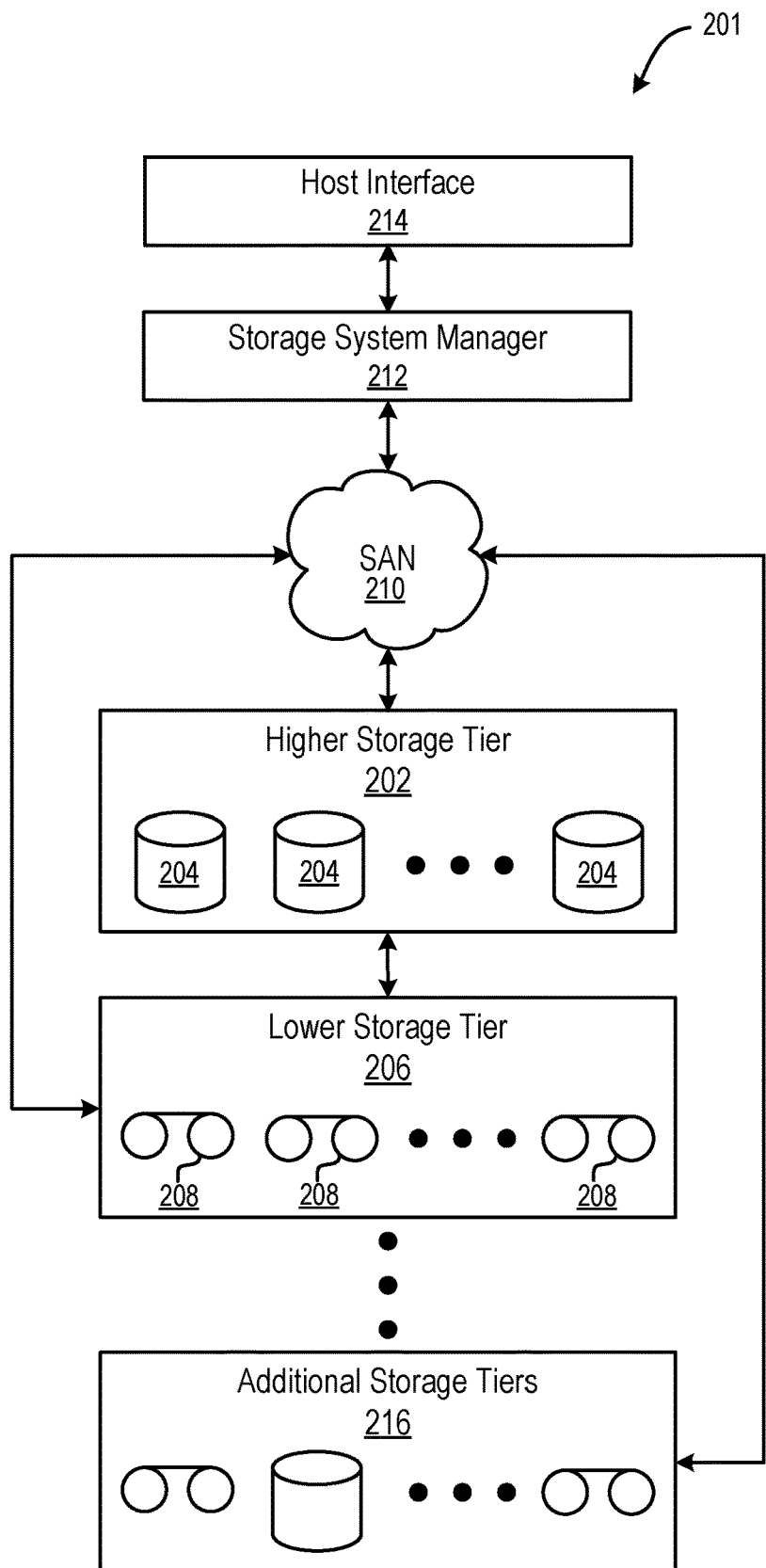
FIG. 2 is a diagram of a tiered data storage system, in accordance with one embodiment of the present invention.

Now referring to FIG. 2, a storage system 201 is shown according to one embodiment. Note that some of the elements shown in FIG. 2 may be implemented as hardware and/or software, according to various embodiments. The storage system 201 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 201. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 201 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 201 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 201) may include logic configured to receive a request to open a data set, logic configured to determine if the requested data set is stored to a lower storage tier 206 of a tiered data storage system 201 in multiple associated portions, logic configured to move each associated portion of the requested data set to a higher storage tier 202 of the tiered data storage system 201, and logic configured to assemble the requested data set on the higher storage tier 202 of the tiered data storage system 201 from the associated portions.

Of course, this logic may be implemented as a method on any device and/or system or as a computer program product, according to various embodiments.

According to one embodiment, a method improves confidential computing in the cloud. A primary goal of confidential computing is to ensure client data in the cloud is protected and confidential, and to encourage clients to move more of the client's sensitive data and computing workloads to cloud services. One key problem is how to build a trusted environment including trusted infrastructure, trusted runtime environment, trusted code stack, trusted vendors selection. In currently available solutions, the client does not have a means for verifying the integrity of the cloud environment against non-trivial requirements. As described herein, the disclosure describes a method for building and using a multi-party Attestation Model for controlling operation of a multi-tenant cloud infrastructure. In a preferred embodiment, the method is implemented in a multi-tenant database as a service infrastructure.

According to one embodiment, a method provides technically assured control of processes for building, updating, running, and operating components of said cloud infrastructure. The technical mechanisms are in place to control the components of the cloud infrastructure to ensure verification and prohibit a non-compliant operation, non-compliant updates, non-compliant fail over to less secure components, etc. The system and mechanism include communication between the components, component nodes, load balancers, databases, etc. involved in a request within the cloud infrastructure.

In one example, a client sends requirements that only allows the cloud service provider to store the client's data on a specifically trusted database system, and consequently, the client has prohibited running any parts of the database system that are not trusted. Conversely, a cloud service provider may prevent a client from connecting to a database from an untrusted device. The cloud service provider may ensure that every attempt from a client to connect from an untrusted device is detected.

Since a conventional computing environment may not be a confidential computing environment, systems and methods describe herein provide a system to enable and satisfy trusted requirements of components, execution environments, database systems, storage components, network infrastructure, load balancers, etc. The cloud administrators cannot access or tamper data that is stored on files. The process described herein also provide protection of data in use that is currently being processed, that is currently in the main memory of processes running in the computing environment. The data in use needs to be protected from unauthorized access and also needs to be protected from the cloud administrators.

According to one embodiment, an attestation is a cryptographically assured mechanism for providing evidence of certain characteristics of a workload in an execution environment. An attestation service may be built in an execution environment. In one approach, an Attestation Model associated with cloud customers and cloud providers is built to verify and control intended operations. The Attestation Model may be built according to requirements of cloud customers and cloud providers. In one approach, multiple layers of confidential computing modules may be built based on an Attestation Model.

According to one embodiment, a system and method provide a mechanism for technical assurance of control of such processes. For example, and not meant to be limiting in any way, Build a new version of an image for one of the services (e.g., DBaaS, Database as a Service) components,
Build a new feature for the service (e.g., DBaaS),
Upgrade the service (e.g., DBaaS),
Deploy an image or a feature,
Run and operate the multi-tenant service,
Control behavior and operation of the various service nodes and clients (e.g., clients may be running outside the cloud on premises of a customer),
Facilitate and control communication and interaction between service components, nodes, and clients, with each other or with other components of the cloud or the various tenants on premises infrastructure.

Figure 3:
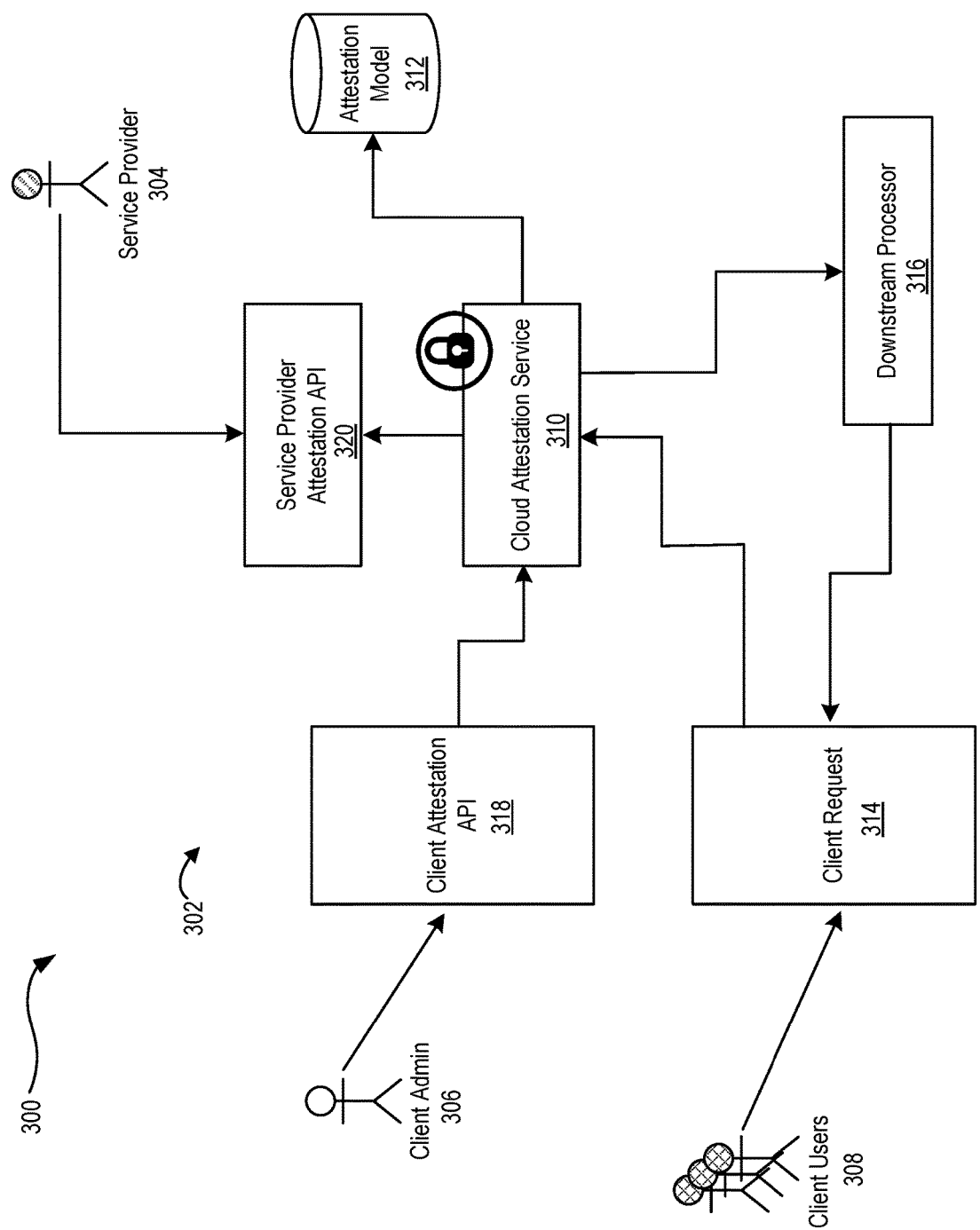
FIG. 3 is a schematic diagram of the architecture of a system, in accordance with one embodiment of the present invention.

FIG. 3 illustrates a schematic drawing of the architecture of a system 300, according to one embodiment. The system 300 may run in one or several trusted execution environments (TEE) 302 of a computing environment. For example, different components such as CAS, APIs, downstream processor, etc. may be distributed on several TEEs. As one can see, these processes typically comprise multiple parties such as a service provider(s) 304, service provider administrators, tenants (e.g., client users 308), client administrators 306, etc.

A client attestation service (CAS) 310 runs inside a TEE 302. The CAS 310 facilitates the updating of an Attestation Model 312. In one approach, the Attestation Model 312 is stored inside the TEE 302. In another approach, the Attestation Model 312 is stored outside the TEE 302 and is protected by signature/encryption keys that never leave the TEE 302.

The CAS 310 receives client requests 314 (e.g., smart contract) from client users 308. The CAS 310 may receive at least one client request 314 from each client user 308. A smart contract is a document in a machine readable form that can be processed by the Cloud Attestation Service. A smart contract may be protected by a signature. A smart contract is machine readable, with several checks, validations, requirements, etc., e.g., in a programming code like representation. A smart contract may be processed by the components of the system in a deterministic fashion. A smart contract may be created by one of the parties, e.g., a client, a service provider, etc. A smart contract may be created on behalf of one of the parties and represents the requirements of the respective party.

The CAS 310 includes a trusted smart contract execution subcomponent for facilitating a Downstream Processor 316 for downstream processes. The CAS 310 may be an activator of downstream processes. For example, the CAS may facilitate and activate downstream processes such as checks being requested, data being requested, changing or reconfiguring components of the cloud infrastructure, etc. The Downstream Processor, for example, uses and invokes APIs of the components in the cloud environment to implement requested downstream processes.

The CAS 310 may provide a deployment function to deploy client/tenant 308 specific smart contracts via the Client Attestation API 318 and client administrators 306. In addition, the CAS 310 may provide a deployment function to deploy service provider 304 specific smart contracts via a Server Provider Attestation API 320. For example, the Client Attestation API 318 and/or the Service Provider Attestation API 320 may request verification of their requirements, receive an attestation which represents proof that the requirements are met, etc. The CAS 310 interfaces with the Service Provider 304, the client administrators 306, and/or the client/tenants 308 and determines certain actions according to the attestations.

According to one embodiment, a system may determine if a request is processed within a cloud infrastructure, if the request is processed on trusted hardware, if the request is processed on non-trusted hardware, etc. Typically, in a Confidential Computing use case, a cloud service provider ensures that a request is processed in a trusted environment and does not fall back into a non-trusted environment. For example, in some prior art, a program is running on a trusted execution environment in a confidential computing environment, but then the system is rebooted, and the program may be migrated over to a less secure system by an automatic failover process implemented by one of the cloud environment components. In contrast, as described herein, a system and a method control the operation of the computing environment adhering to the requirements of clients and service providers, and, for example, ensuring no non-trusted components are involved in the running of the program.

Figure 4:
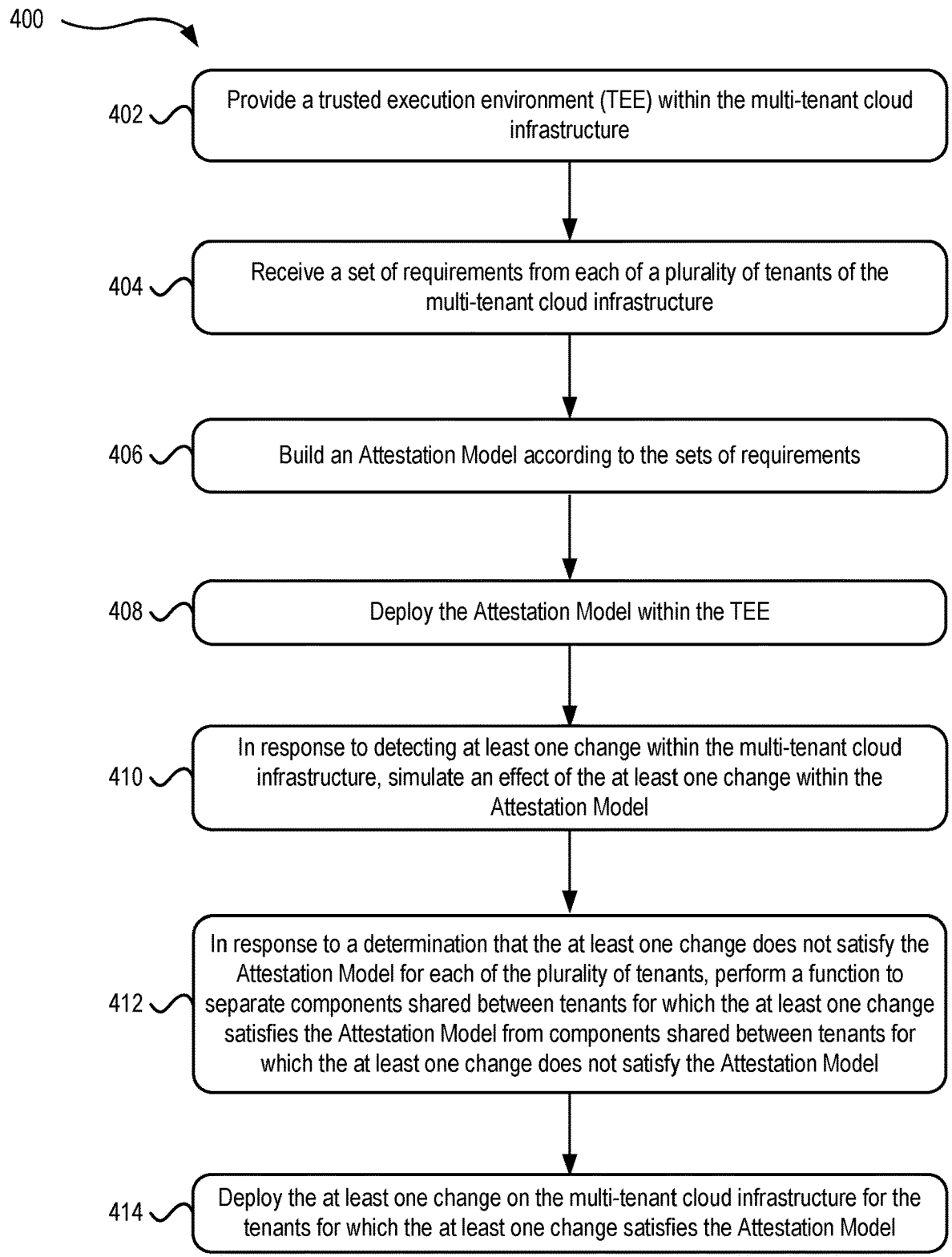
FIG. 4 is a flowchart of a method for building and using a multi-party Attestation Model for controlling operation of a multi-tenant cloud infrastructure, in accordance with one embodiment of the present invention.

Now referring to FIG. 4, a flowchart of a method 400 for building and using a multi-party Attestation Model for controlling operation of a multi-tenant cloud infrastructure is shown, according to one embodiment. The method 400 may be performed in accordance with the present invention in any of the environments depicted in FIGS. 1-12B, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

The method for building an Attestation Model may be described as follows. As shown in FIG. 4, method 400 may initiate with operation 402, where a trusted execution environment (TEE) is provided within the multi-tenant cloud infrastructure.

Operation 404 includes receiving a set of requirements from each of a plurality of tenants of the multi-tenant cloud infrastructure. The set of requirements may be in the form of a smart contract (SC). In one approach, a client/tenant creates smart contract by choosing and customizing a template from the Smart Contract Template Registry and sending the smart contract to the CAS to request approval of the smart contract. In one approach, templates may be created automatically. In another approach, templates may be created semi-automatically based on a cloud infrastructure/component inspection. For example, a template may be generated for each component and may be extended by an administrator (e.g., a human administrator).

The smart contract may include instructions for calculating a result (e.g., at least a success flag) based on the results of other smart contracts. For example, a result of other smart contracts may have an identification, such as an id, or other means, that indicate a follow up. The smart contract may include instructions for calculating a result from attestation records (such as "quotes"/"measurements") to be obtained via a remote attestation protocol from cloud, client, etc. components. The smart contract may specify constraints on acceptable parameters of a remote attestation protocol.

In another optional approach, a smart contract may specify instructions to be executed if execution fails. For example, the smart contract includes instructions to be executed if the execution of the smart contract itself fails, or if the results of executing another selected smart contract fail, or if an attestation verification fails, etc. For example, instructions may include one of the following commands: send a notification to a certain address, prohibit certain requests, request a SRE callout, either allow or prohibit automatic conflict resolution by the CAS, etc. These instructions can be sent to the Downstream Processor for execution of the instructions.

The CAS either rejects or approves the smart contract. In a preferred embodiment, the CAS may also request the Service provider to acknowledge (e.g., affirm) or reject the smart contract.

Operation 406 includes building an Attestation Model according to the sets of requirements. In one approach, if a set of requirements (e.g., a smart contract) is approved by all parties, the CAS adds the smart contract to the Attestation Model. In an Attestation Model, the SC is associated with a tenant and a unique id. If the CAS rejects the client-initiated smart contract, the client may react by disabling further use of the cloud. The client-independent approval step allows the CAS to ensure integrity and functionality and performance of the smart contract. For example, the CAS may reject badly designed SCs which would be too costly to execute, such as the smart contract does not allow caching/reuse of intermediate attestation, smart contract result flows, etc.

In one approach, an Attestation Model may be built based on a cumulation of approved sets of requirements, e.g., smart contracts from a plurality of tenants in a multi-tenant cloud infrastructure. Each tenant of a multi-tenant cloud infrastructure shares the Attestation Model of the TEE. In another approach, an Attestation Model may be specific to one tenant and may be built based on a cumulation of approved sets of requirements from one tenant.

In another approach, a system provider may create and send a set of requirements (e.g., smart contracts) to the CAS. The CAS may approve or reject the system provider-initiated smart contracts.

Operation 408 of method 400 includes deploying the Attestation Model within the TEE. The CAS manages the Attestation Model by executing an approved set of requirements, e.g., a smart contract. For example, the CAS deploys the Attestation Model for each of the plurality of tenants within the multi-tenant cloud infrastructure.

The CAS manages changes from the client users, client administration, service providers, etc. within the multi-tenant cloud infrastructure. Operation 410 includes in response to detecting at least one change within the multi-tenant cloud infrastructure, simulating an effect of the at least one change on the AM (or, if there are multiple tenant-specific AMs, on a set of AMs). In various approaches, the change may be a requested update to the multi-tenant cloud infrastructure The effect may result from a change in the state of the computing environment, a change in a condition of the computing environment, etc.

Operation 412 includes in response to a determination that the at least one change does not fully satisfy the Attestation Model for each of the plurality of tenants (e.g., does not satisfy each set of requirements from each tenant, does not satisfy the Attestation Model for all components, etc.), performing a function to separate, and/or equivalently untangle, the cloud infrastructure components shared between the tenants for which the at least one change satisfies the Attestation Model from components shared between the tenants for which the at least one change does not satisfy the Attestation Model. In one approach, the function for untangling the components of the tenants may be a sharing conflict resolution function that identifies shared components between tenants.

Operation 414 includes deploying the at least one change on the multi-tenant cloud infrastructure for the tenants for which the at least one change satisfies the Attestation Model. In response to receiving updated requirements from at least one of the tenants in response to deploying the at least one change on the multi-tenant cloud infrastructure, the Attestation Model is updated according to the updated requirements or the updated cloud infrastructure.

As described herein, the systems and methods in a multi-tenant cloud infrastructure use an Attestation Model to verify and control intended operations. An Attestation Model may be created based on requirements and conditions from the various parties.

Advantages of the embodiments described herein include using attestation for real-life confidential computing use cases, reducing potential risk of updating or upgrading, operating a service, etc., allowing clients to use a tailored feature set, and allowing and requiring customers to check code/environment. Moreover, various embodiments are applicable to specific application or service (e.g., database as a service) specific use cases.

In one example, a client admin can prevent a service provider from deploying one node of a DBaaS on an untrusted execution environment or on a node having an untrusted build of a DB software. The client admin can also prevent a DB user from accidentally replicating a DB to an untrusted node.

In another example, a service provider can prevent a client user form connecting to a DB from an untrusted device or triggering certain requests/commands after using a less trusted authentication method.

Figure 5:
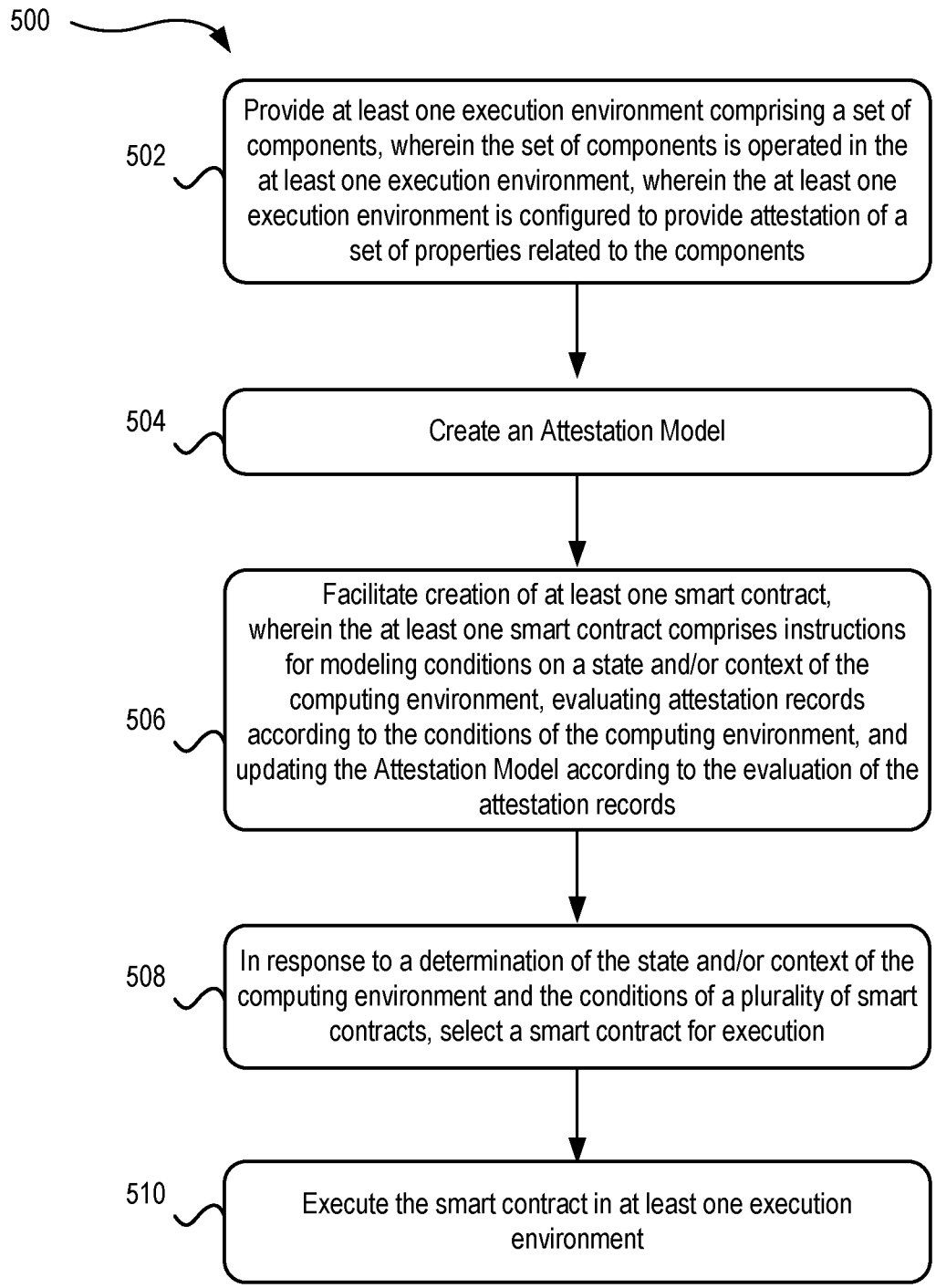
FIG. 5 is a flowchart of a method for building and managing an Attestation Model for controlling operation of a multi-tenant cloud infrastructure, in accordance with one embodiment of the present invention.

Now referring to FIG. 5, a flowchart of a method 500 for building and managing an Attestation Model for controlling operation of a multi-tenant cloud infrastructure in a computing environment is shown, according to one embodiment. The method 500 may be performed in accordance with the present invention in any of the environments depicted in FIGS. 1-7B, among others, in various embodiments. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where at least one execution environment is provided. The execution environment includes a set of components, where the set of components is operated in the at least one execution environment. The execution environment also includes a set of services, where each service comprises a plurality of the components. The execution environment is preferably a trusted execution environment in a multi-player cloud infrastructure. The method 500 runs in a trusted execution environment.

The trusted execution environment is configured to provide a cryptographically assured attestation of a set of properties related to the components operating in the execution environment. In one approach, the attestation of the set of properties may be a signed attestation document that includes the set of attestation records according to the conditions of the computing environment. The attestation records of the set of properties includes: a fingerprint, a checksum, a container identification, a version number, a build identification of a container, etc. In one approach, the trusted execution environment provides a secure enclave and protects the cloud attestation service from an unauthorized administrator access.

Operation 504 includes creating an Attestation Model. The Attestation Model may be based on the set of properties related to the components operating in the computing environment. An attestation service (e.g., a client attestation service (CAS)) facilitates the updating of the Attestation Model. The attestation records include at least attesting data related to the execution of the smart contract. In one approach, the attestation data includes data related to the update of the Attestation Model.

Operation 506 includes facilitating the creation of at least one smart contract. The smart contract includes instructions for modeling conditions on a state and/or context of the computing environment, querying and evaluating attestation records according to the conditions of the computing environment, and updating the Attestation Model according to the evaluation of the attestation records. The smart contract may be acknowledged by one of the players, for example, by at least one client and/or a service provider. In some approaches, the client is a tenant in a multi-tenant cloud infrastructure.

The context of the computing environment may include clients connected to components of specific services inside the computing environment. For example, the context of the computing environment may include tenants of the multi-tenant cloud infrastructure and the related specific services for each of the tenants.

Operation 508 includes, in response to a determination of the state and/or context of the computing environment and the conditions of a plurality of smart contracts, selecting a smart contract for execution.

Operation 510 includes executing the smart contract in at least one execution environment. Execution of the smart contract may include the following operations: executing instructions of the smart contract, updating the Attestation Model according to the execution, creating at least one attestation record in a set of execution environments, and facilitating an automatic reaction/response to a player request and/or to a system state change. The player may be defined as a client (e.g., a tenant), a service provider, a client administrator, a service provider administrator, etc.

In one approach, facilitating the automatic reaction/response may be specific for each tenant (e.g., the response may be scoped per tenant). Other tenants in the multi-tenant cloud infrastructure are unaffected by the automatic reaction/response. In one approach, the smart contract includes instructions to execute an automatic response for a specific tenant, where the other tenants are unaffected by the automatic response. For example, within a confidential computing environment, a service(s) requested by one tenant is specific for the one tenant, and information, requirements, etc. associated with the requested service is not exposed to other tenants in the computing environment, and moreover, the requested service is not exposed to other client administrators, service providers, etc. within the computing environment (i.e., client administrators cannot use the data associated with the one tenant's service request).

In various approaches, the automatic response (e.g., automatic reaction) to the player request and/or to the system state change may be one of the following: executing the request and monitoring state changes, simulating the request and monitoring simulated state changes, rejecting a request and returning an error response, logging a situation of the automatic response, shutting down select components and/or services, notifying the player, etc. The automatic response may include a combination of responses.

In one approach, the automatic response (e.g., automatic reaction) to the player request (e.g., client request, service provider request, etc.) and/or to the system state change may include triggering a follow up action (e.g., workflow) to manage the automatic response. The follow up action may include a manual follow up action, a semi-manual follow up action, an automatic follow up action, etc.

In another approach, the automatic response to the player request and/or to the system state change may include a specific follow up action for an affected tenant in a multi-tenant cloud infrastructure. For example, the automatic response is scoped for an affected tenant and the other unaffected tenants are not included in the response. In one approach, resources shared between tenants are untangled, and resources pertaining to the affected tenant are included in the response.

Figure 6:
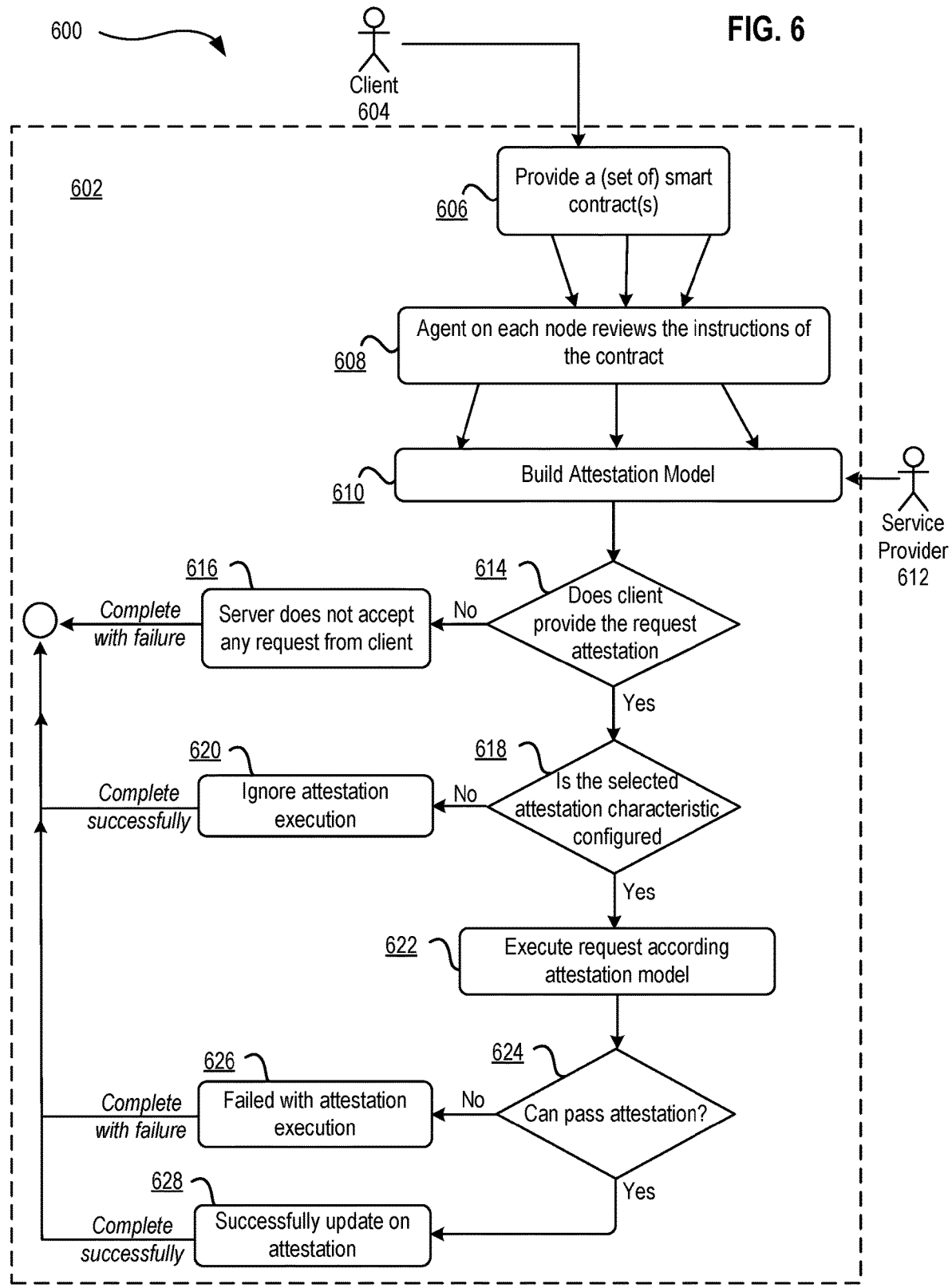
FIG. 6 is a schematic diagram of a process of creating an Attestation Model, in accordance with one embodiment of the present invention.

FIG. 6 illustrates one example of a system 600 of creating an Attestation Model in an execution environment via a client attestation system, according to one embodiment. As an option, the present system 600 may be implemented in conjunction with features from any other embodiment listed herein, such as those described with reference to the other FIGS. Of course, however, such system 600 and others presented herein may be used in various applications and/or in permutations which may or may not be specifically described in the illustrative embodiments listed herein. Further, the system 600 presented herein may be used in any desired environment.

It will be clear that the various features of the foregoing systems and/or methodologies may be combined in any way, creating a plurality of combinations from the descriptions presented above.

The client attestation system (CAS) 602 manages the Attestation Model by executing approved smart contracts. As shown in the system 600, a client 604 initiates an operation 606 such that to provide a smart contract for building an Attestation Model. In one approach, operation 606 may provide a set of smart contracts for building an Attestation Model. In one approach, the smart contract includes requirements for the Attestation Model. A client may provide a plurality of contracts (e.g., smart contracts) for the Attestation Model as indicated by a plurality of arrows leading to operation 608.

In operation 608 an agent on each node reviews the instructions of the contract, such as specifications for an upgrade the Attestation Model. These instructions lead to operation 610 of building the Attestation Model. The service provider 612 may provide the input via the CAS 602.

The instructions and/or Attestation Model may include a series of decisions in the system 600. An initial decision 614 may include a determination of whether the client 604 provides the request attestation. A No response to decision 614 leads to operation 616 indicating that the server does not accept any request from client. and the request subsequently completes with failure. A Yes response to decision 614 leads to decision 618 to determine whether the selected attestation characteristic is configured.

A No to decision 618 leads to operation 620 to ignore attestation execution, and the request completes successfully. A Yes to decision 618 leads to operation 622 to execute request according to the Attestation Model. A decision 624, following execution of the request in operation 622, includes a determination of whether the request can pass attestation.

A No to decision 624 leads to operation 626 that indicates a failed attestation execution, leading to complete with failure. A Yes to decision 624 leads to operation 628 of a successful update on attestation such that the request is completed successfully.

In one approach, when a new smart contract (e.g., a request, a set of requirements, etc.) is deployed, the CAS executes the smart contract instructions in the smart contract execution subcomponent. If the smart contract execution includes and depends upon other smart contract results, the CAS then recursively invokes these smart contracts or uses the smart contract result previously calculated and stored in the Attestation Model. Also, if the smart contract execution depends on an attestation record, the CAS either uses the attestation record from the Attestation Model (if available) or prepares (according to the conditions comprised in the currently executed smart contract) and executes a remote attestation request. It then validates the results of the smart contract execution or remote attestation and continues execution of the smart contract using said result.

According to one embodiment, the CAS maintains the Attestation Model. If necessary, it re-executes smart contracts and updates the Attestation Model. The CAS can also simulate smart contract re-execution and Attestation Model updates (e.g., by executing smart contracts but not committing corresponding Attestation Model updates). These updates may be caused by the following events, for example:

Actual cloud state changes such as modification of cloud components, e.g., updating the software of a DB node or a load balancer, Planned or simulated cloud state changes, Actual client side events such as log, DB queries from a new device, etc., Planned or simulated client side events, Deployment, undeployment, updates of smart contracts.

The CAS can integrate with conventional cloud management tools to detect this kind of event by registering at conventional cloud monitoring managers, secure endpoint managers, etc. For example, an event that employs the Attestation Model may be when a system has changed with an update of a cloud component, the smart contract might be deployed and the Attestation Model is in place and the requirements have been verified successfully. An event can be an update to the cloud infrastructure, e.g., performed by the service provider or performed on behalf of the service provider. An event can also be an error in the cloud infrastructure or can be caused by an error or a certain state of the cloud infrastructure or a component in the computing environment. For example, if a system goes down, a prior art mechanism may shift the workload away from the failing system to another system. The system, as described herein, can intercept cloud state changes before the changes happen in the hardware, software, any instance in the computing environment. The cloud management intercepts the requests for updating cloud components, receiving notification before the cloud update happens but the cloud management is aware of planned or pending updates, and then the system can be implemented.

The CAS may also intercept cloud management operations. Before the operations are actually performed, the CAS may simulate the effects of the operation on the Attestation Model and will only allow the operation if the simulation is successful (i.e., not leading to additional non-resolvable failures), and will otherwise prohibit the operation. During the simulation, the CAS may need to use simulated attestation records.

For each actual or simulated event, the CAS may determine the affected cloud or client components, and then—by lookup of the various smart contract-related indexes—it determines the smart contracts which need to be re-evaluated. The CAS may re-execute these smart contracts, update the Attestation Model, trigger the follow-up corresponding actions, etc. as described herein. In some approaches, the Attestation Model, depending on the environment, may be indexed, or reverse indexed in order to more efficiently access or cross reference components, and not be impeded by performance problems.

The Attestation Service may call out to the Client API in case it needs to trigger remote attestation on client components. For example, the CAS may call out to two components of the cloud infrastructure to access attestation of the properties of these components. In one approach, the CAS may also provide a state of execution of a smart contract by assigning a document that signifies that this smart contract was executed at this point in time using this data with these results.

If a smart contract execution fails, the CAS determines if the smart contract allows conflict resolution. If so, the CAS performs a conflict resolution step immediately after the failed execution of the smart contract. In case of a simulated event, the CAS may prohibit the actual event. The conditions for this prohibition step may be defined by the smart contract, e.g., for what time a DB node software update should be prohibited, which types of follow up actions should be triggered (e.g., notifying a service provider SME), etc. The CAS performs root cause analysis for a newly failing smart contract execution. After identifying a set of invalid attestation records, the CAS may automatically or semi-automatically (e.g., by requesting operator intervention) rectify the situation. In one approach, the CAS may automatically trigger a workflow to update a software version of a cloud component.

One example of the CAS performing conflict resolution of a shared component between clients is as follows: Client A has a smart contract in place that allows use of two versions of a service provided by the service provider, V1 and V2. Client B has a smart contract in place that requires a certain specific version of the same service, V1. For example, the service provider can provide a V1 version of the service for both services and can run a service instance of this service V1 for both clients. Both Client A and Client B are satisfied within the trusted execution environment. However, if the service provider updates the service instance to service version V2, the requirements of Client B would no longer be satisfied.

According to systems and methods described herein, a cloud attestation service (CAS) allows a cloud service provider to introduce the update to the cloud infrastructure. The cloud attestation service identifies the conflict of updating the service instance used by both Client A and Client B that violates the requirements of the smart contract of Client B, e.g., the conflict of shared components between Client A and Client B. The cloud attestation service provides conflict determination and conflict resolution during changes of a cloud infrastructure. One approach includes decoupling the shared components between Client A and Client B, e.g., by automatically creating a separate service instance for Client A that implements service version V2 and automatically redirecting Client A to this new service instance.

Typically, before applying these resolution actions in the cloud, the CAS may simulate them. During this simulation, the CAS may recognize that there are conflicting requirements on a shared resource. In this case, the CAS may trigger automatic or semi-automatic resolution of this situation by starting a workflow to create a tenant-specific instance of the previously shared resource.

The CAS analyses the smart contract and optionally re-requests approval of this contract from other parties like the service provider. This may bay be done to recognize and rectify outdated smart contracts that accidentally prohibit an otherwise valid update.

The CAS notes any Attestation Model changes and can thus determine further smart contracts that need to be re-executed until this process finally converges. The CAS allows intended cloud operations via simultaneously meeting all requirements of all relevant parties. The CAS ensures requirements compliance of a cloud offering a plurality of operations.

FIG. 7A is an example smart contract provided by a Service Provider in an example language. Whenever a DB client triggers an event like initiating a DB client connection with the DBaaS or a previously created Attestation Model record expires, this example smart contract does the following:

It checks the location, the client device integrity and the client permission on this service.

It fails if these checks fail, this automatically removes any attestation records related to this client and service from the Attestation Model.

If the checks succeed, the contract updates the Attestation Model by adding an attestation record for the service and the client. This record will timeout after 30 minutes. This timeout will then trigger another execution of this smart contract.

FIG. 7B is an example smart contract provided by a client in an example language. An event may be triggered by a service provider, DB user, etc. Whenever a DB triggers an event related to a DB node such as adding or replacing a new DB node or a previously created Attestation Model record expires, this example smart contract does the following in a very simple example logic:

It checks the Attestation Model for this node. As the smart contract is executed in a trusted zone, the Attestation Model is trusted.

It fails if these checks fail, and trigger reparation of the error thus rejecting the event.

If the checks succeed, the contract updates the Attestation Model by adding an attestation record for the service and the client. This record will timeout after 30 minutes. This timeout will then trigger another execution of this smart contract.

As one can see, these processes typically comprise multiple parties like the service provider and service provider administrators, as well as various tenants and their client administrators. Also, the components of the DBaaS may operate on behalf of multiple tenants and users. For example, one user belonging to a tenant's organization may use a DB client to connect to the DBaaS.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for building and using a multi-party Attestation Model for controlling operation of a multi-tenant cloud infrastructure, the method comprising:

providing a trusted execution environment (TEE) within the multi-tenant cloud infrastructure;

receiving a set of requirements from each of a plurality of tenants of the multi-tenant cloud infrastructure;
building an Attestation Model according to the set of requirements;
deploying the Attestation Model within the TEE;
in response to detecting at least one change within the multi-tenant cloud infrastructure, simulating an effect of the at least one change within the Attestation Model;
in response to a determination that the at least one change does not satisfy the Attestation Model for each of the plurality of tenants, performing a function to separate components shared between tenants for which the at least one change satisfies the Attestation Model from components shared between tenants for which the at least one change does not satisfy the Attestation Model; and
deploying the at least one change on the multi-tenant cloud infrastructure for the tenants for which the at least one change satisfies the Attestation Model.

2. The computer-implemented method of claim 1, wherein the set of requirements is in a form of a smart contract.

3. The computer-implemented method of claim 1, wherein the at least one change is a requested update to the multi-tenant cloud infrastructure.

4. The computer-implemented method of claim 1, further comprising, in response to receiving updated requirements from at least one of the tenants, updating the Attestation Model according to the updated requirements.

5. A computer-implemented method for controlling operation of a multi-tenant cloud infrastructure in a computing environment, the method comprising:
providing at least one execution environment comprising a set of components,
wherein the set of components is operated in the at least one execution environment,
wherein the at least one execution environment is configured to provide an attestation of a set of properties related to the components;
creating an Attestation Model;
facilitating creation of at least one smart contract,
wherein the at least one smart contract comprises instructions for modeling conditions on a state, on a context, or on a state and context of the computing environment, evaluating attestation records according to the conditions of the computing environment, and updating the Attestation Model according to the evaluation of the attestation records;
in response to a determination of the state, the context, or the state and context of the computing environment and the conditions of a plurality of smart contracts, selecting a smart contract for execution; and
executing the smart contract in at least one of the at least one execution environment.

6. The computer-implemented method of claim 5, wherein the at least one smart contract is acknowledged by at least one client and a service provider.

7. The computer-implemented method of claim 6, wherein the client is a tenant in a multi-tenant cloud infrastructure.

8. The computer-implemented method of claim 5, wherein the attestation of the set of properties is a signed attestation document comprising a set of the attestation records according to the conditions of the computing environment.

9. The computer-implemented method of claim 8, wherein at least one of the attestation records is selected from the group consisting of: a fingerprint, a checksum, a container identification, a version number, and a build identification of a container.

10. The computer-implemented method of claim 5, wherein the context of the computing environment comprises clients connected to components of specific services inside the computing environment.

11. The computer-implemented method of claim 5, wherein the execution of the smart contract comprises:
executing instructions of the smart contract,
updating the Attestation Model according to the execution,
creating at least one attestation record in a set of execution environments, and
facilitating an automatic response to a request from a player, to a system state change, or to a request from the player and to the system state change.

12. The computer-implemented method of claim 11, wherein the player is selected from the group consisting of: a client, a tenant, and a service provider.

13. The computer-implemented method of claim 11, wherein facilitating the automatic response is specific for each tenant, wherein other tenants in a multi-tenant cloud infrastructure are unaffected by the automatic response.

14. The computer-implemented method of claim 11, wherein the updating of the Attestation Model is facilitated by an Attestation Service.

15. The computer-implemented method of claim 11, wherein at least one of the at least one attestation record includes attesting data related to the execution of the smart contract.

16. The computer-implemented method of claim 11, wherein the automatic response is selected from the group consisting of:
executing the request and monitoring state changes,
simulating the request and monitoring simulated state changes,
rejecting a request and returning an error response,
logging a situation of the automatic response,
shutting down select components, select services, or select components and services,
notifying the player, and
a combination thereof.

17. The computer-implemented method of claim 11, wherein the automatic response comprises triggering a follow up action to manage the automatic response, wherein the follow up action is selected from the group consisting of: a manual follow up action, a semi-manual follow up action, and an automatic follow up action.

18. The computer-implemented method of claim 17, wherein the automatic response comprises a specific follow up action for an affected tenant in a multi-tenant cloud infrastructure.

19. A system in a computing environment, the system comprising:
an execution environment comprising,
a client attestation service operating in the execution environment,
wherein the client attestation service comprises a set of services, each service comprising a plurality of components, and
an Attestation Model based on a cryptographically assured attestation of a set of properties related to the components operating in the execution environment; and
a processor circuit, logic integrated with the processor circuit, executable by the processor circuit, or integrated with and executable by the processor circuit, the logic being configured to:
- facilitate creation of at least one smart contract comprising instructions for updating the Attestation Model according to a state, a context, or a state and context of the computing environment;
- in response to a determination of the state, the context, or the state and context of the computing environment, selecting a smart contract; and
- executing the smart contract in the execution environment.

20. The system as recited in claim 19, wherein the execution of the smart contract comprises:
- executing instructions of the smart contract,
- updating the Attestation Model according to the execution,
- creating at least one attestation record in a set of execution environments, and
- facilitating an automatic response to a player request, to a system state change, or to a player request and a system state change.

\* \* \* \* \*